(12) United States Patent
Surya et al.

(10) Patent No.: US 10,664,534 B2
(45) Date of Patent: May 26, 2020

(54) SYSTEM AND METHOD FOR AUTOMATIC PRODUCT MATCHING

(71) Applicant: HOME DEPOT PRODUCT AUTHORITY, LLC, Atlanta, GA (US)

(72) Inventors: Siva Kalyana Pavan Kumar Mallapragada Naga Surya, Atlanta, GA (US); Carlos Barcelo, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 13/838,195

(22) Filed: Mar. 15, 2013

(65) Prior Publication Data
US 2014/0136549 A1    May 15, 2014

Related U.S. Application Data

(60) Provisional application No. 61/726,169, filed on Nov. 14, 2012.

(51) Int. Cl.
*G06F 16/9535* (2019.01)

(52) U.S. Cl.
CPC ............... *G06F 16/9535* (2019.01)

(58) Field of Classification Search
CPC ............ G06F 17/749; G06F 17/30864
USPC .................................................. 707/749
See application file for complete search history.

(56) References Cited

U.S. PATENT DOCUMENTS

| | | | |
|---|---|---|---|
| 4,996,642 A * | 2/1991 | Hey | 705/7.29 |
| 6,041,311 A * | 3/2000 | Chislenko et al. | 705/26.7 |
| 6,085,186 A | 7/2000 | Christianson et al. | |
| 6,606,625 B1 | 8/2003 | Muslea et al. | |
| 6,728,706 B2 * | 4/2004 | Aggarwal et al. | |
| 7,117,163 B1 * | 10/2006 | Iyer et al. | 705/7.32 |
| 7,519,621 B2 | 4/2009 | Harik | |
| 7,702,700 B2 * | 4/2010 | Lee | 707/826 |

(Continued)

FOREIGN PATENT DOCUMENTS

WO    WO2010/104619    9/2010

OTHER PUBLICATIONS

Office Action dated Dec. 23, 2014, issued in U.S. Appl. No. 13/841,136.

(Continued)

*Primary Examiner* — Hicham Skhoun
(74) *Attorney, Agent, or Firm* — Greenberg Traurig, LLP (57) ABSTRACT

A source product and a competitor product are automatically matched by computing similarity scores between the products. An attribute of a source product is extracted from information received from a user. The extracted attribute is then used to generate a search term. A search for competitor product information is performed using the search term and a similarity score between the source product and the competitor product is calculated. In one implementation, the similarity score is calculated by generating a first value pair for the source product and the competitor product, and for the first value pair, (1) assigning a value to a degree of similarity between the source product and the competitor product with respect to a common feature, and (2) finding the product of the assigned value and a weight value assigned to the common feature.

20 Claims, 6 Drawing Sheets

(56) References Cited

U.S. PATENT DOCUMENTS

| | | |
|---|---|---|
| 7,970,713 B1 | 6/2011 | Gorelik et al. |
| 8,126,779 B2 | 2/2012 | Wanker |
| 8,140,381 B1 | 3/2012 | Wu et al. |
| 8,165,925 B2 | 4/2012 | Vallaya et al. |
| 8,386,298 B2 | 2/2013 | Bai et al. |
| 8,438,080 B1* | 5/2013 | Xiao ............... G06Q 30/02 705/26.1 |
| 8,719,142 B1 | 5/2014 | Odom |
| 8,818,838 B1 | 8/2014 | Sharma |
| 8,850,329 B1* | 9/2014 | Hill ............... G06F 17/30017 715/738 |
| 9,223,871 B2 | 12/2015 | Mallapragada |
| 2003/0110066 A1 | 6/2003 | Walser et al. |
| 2003/0171978 A1 | 9/2003 | Jenkins et al. |
| 2003/0177103 A1 | 9/2003 | Ivanov et al. |
| 2004/0143508 A1* | 7/2004 | Bohn et al. .............. 705/26 |
| 2004/0267762 A1* | 12/2004 | Tunning et al. ........... 707/100 |
| 2007/0038620 A1* | 2/2007 | Ka et al. ................. 707/5 |
| 2007/0130090 A1 | 6/2007 | Staib et al. |
| 2007/0156678 A1* | 7/2007 | Ashkenazi ......... G06Q 10/087 |
| 2007/0226082 A1 | 9/2007 | Leal |
| 2007/0244883 A1 | 10/2007 | Bessieres et al. |
| 2007/0299743 A1 | 12/2007 | Staib |
| 2008/0010276 A1* | 1/2008 | Morton ............. G06F 17/30675 |
| 2008/0046316 A1 | 2/2008 | Shah et al. |
| 2008/0294996 A1 | 11/2008 | Hunt et al. |
| 2008/0313165 A1* | 12/2008 | Wu ............... G06Q 10/101 |
| 2009/0125549 A1* | 5/2009 | Li ................. G06Q 30/02 |
| 2009/0144101 A1 | 6/2009 | Malov |
| 2010/0010273 A1 | 1/2010 | Belfadhel et al. |
| 2010/0083270 A1* | 4/2010 | Kline et al. .............. 718/104 |
| 2010/0306031 A1 | 12/2010 | McCauley et al. |
| 2011/0040611 A1 | 2/2011 | Simmons et al. |
| 2011/0040766 A1* | 2/2011 | Robinson ........... G06F 17/3053 707/749 |
| 2011/0106581 A1 | 5/2011 | Rohrbasser et al. |
| 2011/0153385 A1 | 6/2011 | Bateni et al. |
| 2011/0191181 A1 | 8/2011 | Blackhurst et al. |
| 2011/0209048 A1 | 8/2011 | Scott et al. |
| 2011/0213644 A1 | 9/2011 | Phene |
| 2011/0270628 A1* | 11/2011 | Mital et al. .............. 705/3 |
| 2011/0320478 A1* | 12/2011 | Carlson et al. ........... 707/769 |
| 2012/0046998 A1 | 2/2012 | Staib et al. |
| 2012/0203760 A1* | 8/2012 | Abraham et al. ......... 707/710 |
| 2012/0259891 A1 | 10/2012 | Edoja |
| 2012/0284113 A1 | 11/2012 | Pollak |
| 2012/0296792 A1 | 11/2012 | Gindlesperger |
| 2012/0330934 A1* | 12/2012 | Duboue et al. ............ 707/722 |
| 2013/0051615 A1* | 2/2013 | Lim ................. G06F 8/61 382/103 |
| 2013/0166348 A1 | 6/2013 | Scotto et al. |
| 2013/0275292 A1 | 10/2013 | Cappucci et al. |
| 2013/0318063 A1* | 11/2013 | Ayzenshtat ........ G06F 17/30864 707/707 |
| 2014/0108308 A1* | 4/2014 | Stout et al. ............... 706/12 |
| 2014/0136278 A1 | 5/2014 | Carvalho |
| 2014/0136283 A1 | 5/2014 | Carvalho et al. |
| 2014/0136285 A1 | 5/2014 | Carvalho |
| 2014/0136494 A1 | 5/2014 | Mallapragada |
| 2014/0149183 A1 | 5/2014 | Liu et al. |
| 2014/0379535 A1 | 12/2014 | Briet et al. |

OTHER PUBLICATIONS

Response to Office Action dated Jun. 23, 2015, filed in U.S. Appl. No. 13/841,136.
Final Office Action dated Jul. 10, 2015, issued in U.S. Appl. No. 13/841,136.
Examiner's Report dated Aug. 28, 2015, issued in related Canadian Patent Application No. 2833502.
Office Action dated Jan. 9, 2015, issued in U.S. Appl. No. 13/841,322.
Response to Office Action dated Jul. 9, 2015, filed in U.S. Appl. No. 13/841,322.
Final Office Action dated Aug. 4, 2015, issued in U.S. Appl. No. 13/841,322.
Office Action dated Jan. 16, 2015, issued in U.S. Appl. No. 13/837,644.
Response to Office Action dated Jul. 16, 2015, filed in U.S. Appl. No. 13/837,644.
Final Office Action dated Sep. 25, 2015, issued in U.S. Appl. No. 13/837,644.
Kushmerick, N.: "Wrapper Induction for Information Extraction", Ph.D. Dissertation, University of Washington, (1997), pp. 1-264.
Kushmerick, N. et al.: "Wrapper Induction for Information Extraction", Int. Joint Conf. AI., (2007), 7 pages.
Kushmerick, N. et al.: "The Wrapper Induction Environment", Proceedings on the Workshop on Software Tools for Developing Agents (AAAI), (1998), pp. 131-132.
Qu, H.: "Wrapper Induction: Construct wrappers automatically to extract information from web sources", CMPT 882 Presentation, (Mar. 28, 2001), 4 pages.
Examiner's Report dated Apr. 9, 2015, issued in corresponding Canadian Patent Application No. 2833356.
Notice of Allowance dated Jul. 27, 2015, issued in U.S. Appl. No. 13/837,961.
Office Action dated Jan. 30, 2015, issued in U.S. Appl. No. 13/841,487.
Response to Office Action dated Jul. 30, 2015, filed in U.S. Appl. No. 13/841,487.
Final Office Action dated Oct. 29, 2015, issued in U.S. Appl. No. 13/841,487.
Office Action dated Jan. 22, 2015, issued in U.S. Appl. No. 13/841,629.
Response to Office Action dated Jul. 22, 2015, filed in U.S. Appl. No. 13/841,629.
Final Office Action dated Aug. 11, 2015, issued in U.S. Appl. No. 13/841,629.
Response to Final Office Action dated Jan. 11, 2016, filed in U.S. Appl. No. 13/841,629.
Office Action received in Canadian counterpart Application No. 2,833,357 dated Aug. 2, 2016 (6 pages).
Office Action received in Canadian counterpart Application No. 2,833,357 dated Jun. 29, 2017, 4 pgs.
Office Action received in Mexican counterpart Application No. MX/a/2013/013343, dated Aug. 1, 2017, 3 pgs.
Office Action received in Canadian counterpart Application No. 2,833,357 dated Jul. 15, 2019, 4 pgs.

\* cited by examiner

| Feature Field | Description | Variants |
|---|---|---|
| UPC | Computed UPC similarity score between the customer and competitor products | UPC vs. Competitor UPC<br><br>UPC in Name<br><br>UPC in HTML |
| MPN | Computed MPN similarity between the customer and competitor products | MPN vs. Competitor MPN<br><br>MPN in Name<br><br>MPN in HTML |
| Brand | Computed Brand similarity between the customer and competitor products | Brand vs. Competitor brand<br><br>Brand in Name<br><br>Brand in HTML |
| Name | Computed name similarity between the customer and competitor products | Customer name vs. competitor name |
| Price | Price similarity is computed as the ratio of the difference of price between customer and competitor products to that of the customer product. | Customer price vs. competitor name |
| Source | Where did the product come from? Did it result in a search based on something reliable as a UPC or something like a name? | Competitor Source |
| Product Attributes | Features computed based on product attributes including but not limited to color, condition, gender, material, measure, object, pattern, quality, size, style, type, units | One feature per attribute<br><br>One feature per family |
| Image histogram | Shape and Color similarity between the customer and competitor images | Color Histogram<br><br>Edge histogram |

*FIG. 4*

| Specific Attribute | Example | Attribute Family | Computation Type |
|---|---|---|---|
| Thread Count for Bed Sheets | 300, 600, 1000 | Size | MATCH_NUMBER |
| T-shirt Size | X, XL, XXL, S, M | Size | MATCH_TEXT_EXACT |
| Fabric Color | Black, Blue, Gray | Color | MATCH_TEXT_APPROXIMATE |
| Power Rating for Drills | 3.5V, 19V | Power | MATCH_NUMBER_UNIT |
| Volume of baby food | 3.5Oz, 100ml | Volume | MATCH_NUMBER_UNIT |

*FIG. 5*

| Match Type | Description |
|---|---|
| MATCH_NUMBER | Match just the numbers found in the crystalized product |
| MATCH_TEXT_EXACT | Try finding the exact same string as the customer attribute value in the competitor |
| MATCH_TEXT_APPROXIMATE | Try finding approximately (to a pre-specified degree and type of approximation) the same string as the customer attribute value in the competitor |
| MATCH_NUMBER_UNIT | Match both numbers and units present. If necessary, convert the units. Possibly include some approximation (1 or 2 ml lost in conversions from Oz to ml, for instance). |

*FIG. 6*

| Feature Name | Value | Classifier Weight | Contribution to the total score |
|---|---|---|---|
| Image | 0.569695 | 2.41945 | 1.3783486 |
| Brand vs. Brand, Name, HTML page | 1.0 | 0.585331 | 0.585331 |
| UPC vs. UPC | 0.0 | 0.0 | 0.0 |
| MPN vs. MPN, Name, HTML | 1.0 | 1.7542 | 1.7542 |
| Source | 3.0 | 0.608368 | 1.825104 |
| Name and Tags | 0.666667 | 0.0 | 0.0 |
| Price vs. Price | 0.0 | -1.43299 | -0.0 |
| Name vs. Name | 0.522727 | 3.60669 | 1.8853142 |
| UPC vs. UPC, HTML | 1.0 | 2.28809 | 2.28809 |

FIG. 7

Source /Customer Product:
UPC: 608938467492
MPN: LCSTBACHBR26
Brand: Armen Living
Armen Living Sonata 26 in. Counter Stool - Dark Brown Seat with Cherry Frame Competing Product:
UPC: 608938467492
MPN: aart-LCSTBACHBR-26, AL-LCSTBACHBR26
Armen Living 11457822 Sonata Brown Leather Bar Stool Features computed for the above products and the classifier weights obtained from the training.
The weighted feature contribution to the overall score is shown in the last column.

| Feature Type | Value | Classifier Weight | Weighted Feature |
|---|---|---|---|
| Image Similarity | 0.569695 | 2.41945 | 1.3783486 |
| UPC Similarity | 1.0 | 4.5123 | 4.5123 |
| Brand vs. Brand, Name similarity | 1.0 | 0.585331 | 0.585331 |
| Price Similarity | 0.0 | 1.43299 | -0.0 |
| MPN vs. MPN and Name and HTML | 1.0 | 1.7542 | 1.7542 |
| MPN vs. MPN and Name | 1.0 | 0.0 | 0.0 |
| Source (nominal) | 2.0 | 0.608368 | 1.216736 |
| Name Similarity | 0.363636 | 3.60669 | 1.3115222 |
| UPC vs. UPC, Name, HTML | 1.0 | 2.28809 | 2.28809 |
| Color Match | 1.0 | 0.0 | 0.0 |
| Intercept | | -3.15547 | -3.15547 |

*FIG. 8*

SYSTEM AND METHOD FOR AUTOMATIC PRODUCT MATCHING

CROSS-REFERENCE TO RELATED APPLICATIONS

This application claims priority to U.S. Provisional Application Ser. No. 61/726,169, filed Nov. 14, 2012 and entitled "SYSTEM AND METHOD FOR AUTOMATIC PRODUCT MATCHING," which is hereby incorporated by reference in its entirety.

TECHNICAL FIELD

This disclosure relates generally to the field of pattern classification and matching, and in particular, applied to product matching.

BACKGROUND

Product matching aims to build algorithms that perform the intelligent task of deciding whether two descriptions of products from two different stores describe the same product or a different product. This is useful in refining the competing products for a given product obtained by searching a product document collection.

SUMMARY

A system and method for product matching according to embodiments aims to find "competing" products for each of a set of input products. A competing product is a product that is identical to the input product from a different store, or is substitutable by some definition of substitutability provided by the customer or a product expert. The former is called an "exact" match and the latter is called a "compatible" match or a "fuzzy" match.

Embodiments produce high quality matches by implementing several kinds of refinement from the plain search results put in place. Further, embodiments are unbounded in terms of number of products or domains. Finally, embodiments relatively minimize the human effort needed per category of products over time.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of this disclosure, which includes all such substitutions, modifications, additions or rearrangements.

BRIEF DESCRIPTION OF THE DRAWINGS

The drawings accompanying and forming part of this specification are included to depict certain aspects of various embodiments. A clearer impression of these embodiments, and of the components and operation of systems provided with them, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Various features and advantageous the present disclosure are explained more fully with reference to the nonlimiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of the context of the disclosure may be helpful. Product matching is a process wherein a customer inputs one or more sets of products and their descriptions. Embodiments disclosed herein can provide a system and method for returning pairs identifying competing products and sellers to the customer. Returned matches may be identical (i.e., all attributes must match) or compatible (i.e., at least a specified number of attributes must match).

Figure 1:
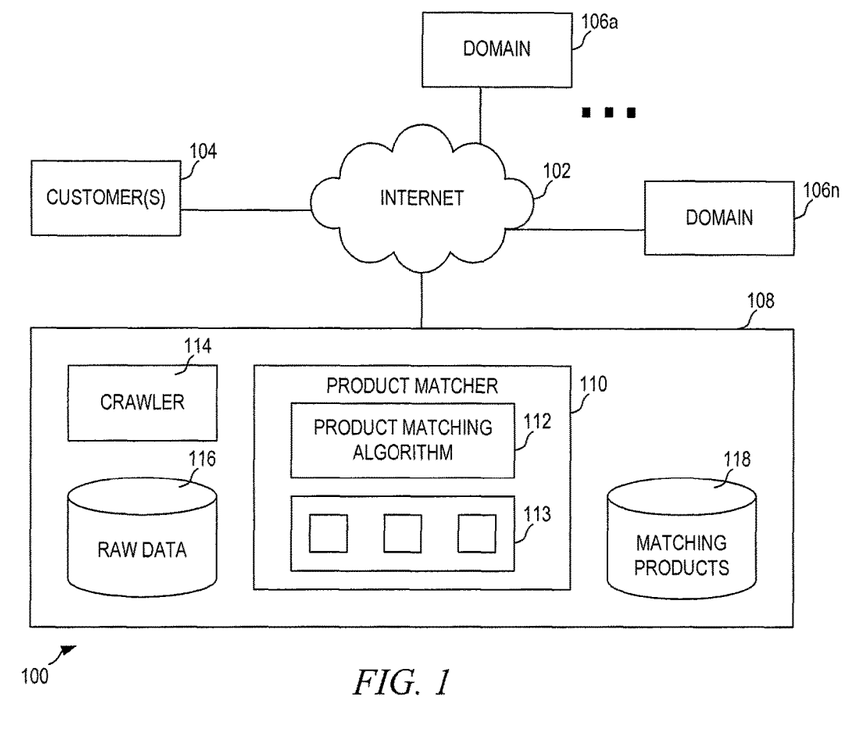
FIG. 1 depicts a block diagram of one embodiment of an architecture in which a product matching system may be utilized.

Turning now to FIG. 1, a block diagram illustrating an exemplary system 100 for implementing product matching in accordance with embodiments is shown. The product matching system 108 couples to, or is in communication with, a network such as the Internet 102 and has access to domains 106a . . . 106n. Also coupled to or in communication with the product matching system may be one or more customers 104. In operation, the one or more customers 104 may input one or more products and one or more attributes thereof and receive back one or more matching products.

In some embodiments, the one or more customers 104 may be retailers who desire information about competitors. Thus, the one or more products submitted may number in the thousands. Embodiments will return information about competitor pricing, etc., for each of the products. Preferably, the matches returned are unbounded. That is, a customer need merely identify a product and need not specify which competitors or which domains are to be searched for a match.

The product matching system 108 may include a product matcher 110 implementing a product matching algorithm 112 and storing matching rules and filters 113. As will be described in greater detail below, the rules and filters 113 may be used to implement feature extraction, filtering, crystallization, post processing, and classification.

The product matching system 108 may further include or be in communication with a crawler 114 operable to crawl the Internet for specific domains and store them in a raw data store 116. The product matching algorithm 112 may operate in conjunction with the rules and filters 113 on domain data from the data store 116 to generate matches, as will be explained in greater detail below.

In other embodiments, the crawler may implement a search engine that may search the Internet directly without requiring a local raw data store. Generated product matches and their source domains may be stored at 118 and returned to the customer 104 via the Internet 102.

Figure 2:
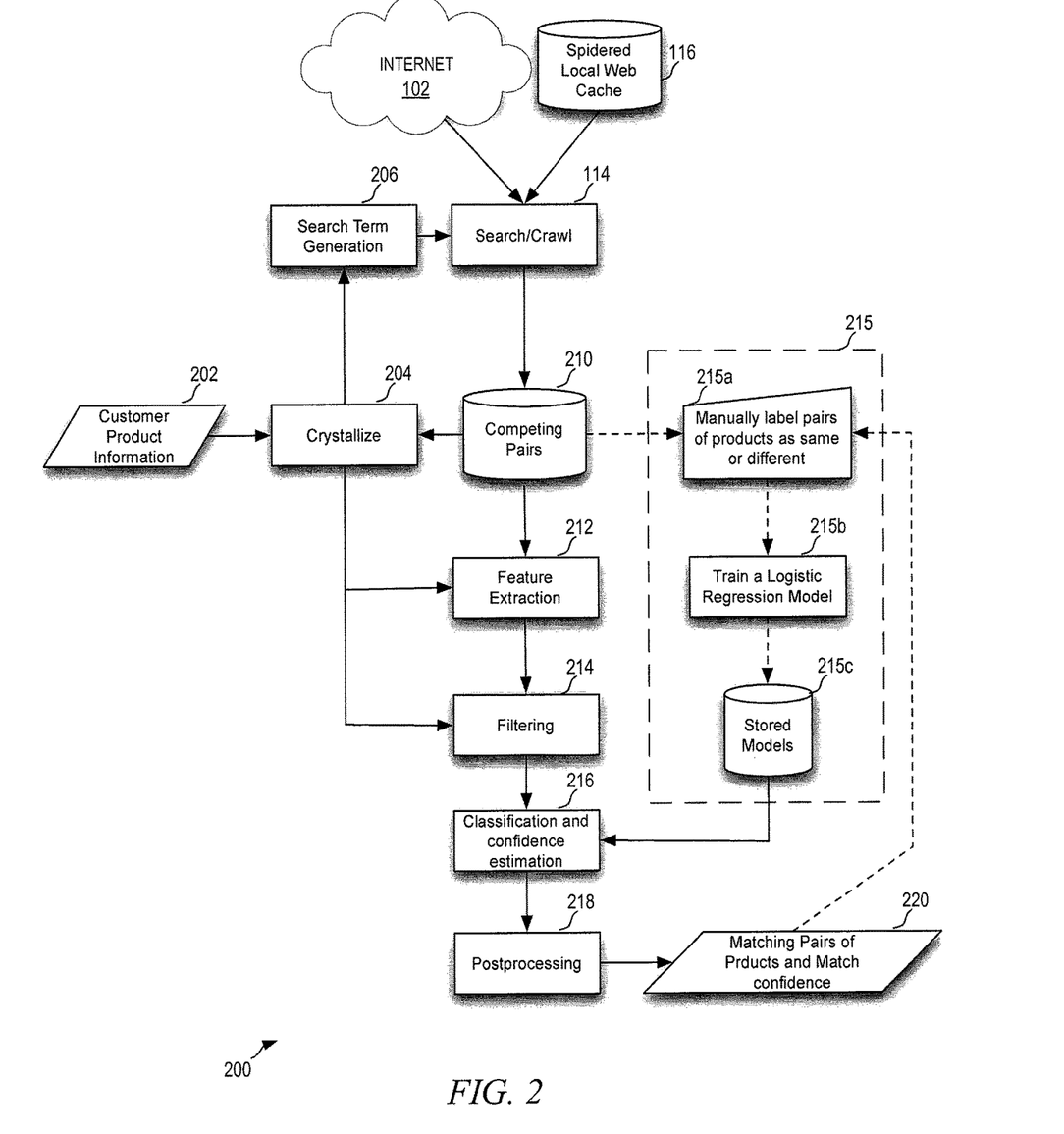
FIG. 2 schematically depicts operation of an embodiment.

Turning now to FIG. 2, a diagram illustrating operation of embodiments is shown. At 202, a customer may input product information. This information may be in an unstructured or nonstandard format. Often the customer product information is merely a name of a product. Consequently, at 204, a system according to embodiments may "crystallize" the customer product information. That is, at 204, the system may identify or extract attributes such as color, size, etc., by identifying various tags present in the name or other descriptions of the product.

Tags may identify scope, categories and priorities. In some embodiments, scope defines the group of products this categorization or prioritization belongs to. Categories define if the tag must match or need not match. Must match tags are included in search term generation, and are included in name-name and name-tag scores, with violating pairs filtered out. Need not match tags are not included in search term generation and are not included in the name-name or name-tag scores. Priorities indicate the degree of importance the tag in the category. In some embodiments, categories/priorities can be combined into a representative schema, for example, according to (−2, −1, 0, 1, 2) or (0, 1, 2, 3).

The crystallized product information is then used at 206 to generate search terms. That is, given a list of product attributes obtained from the crystallize process 204, search term generation may parse or otherwise determine which ones are the most important or significant, according to predetermined criteria. That is, search terms are generated by deleting or combining tokens based on priority.

For example, according to some embodiments, a Universal Product Code (UPC) may be a preferred search term. In other embodiments, a brand and product number may be preferred terms. In still other embodiments, the product name may be preferred. In other embodiments, one or more search terms may be used.

More particularly, the goal of searching for the competing products on the product data document collection is to retrieve a sufficient number (pre-specified) of potentially competing products to the source customer product. In some embodiments, a sequence of search queries is used until the desired number of results is obtained. The sequence starts off by querying using highly reliable information, and slowly relaxing it to allow for similar products rather than exact products, with the hope of retrieving exact products that may be missing this information in the search index, or to identify similar products.

An exemplary search sequence is as follows: (1) UPC; (2) Brand+MPN; (3) Name; (4) Generalized Name (by automatically dropping off unimportant words); and (5) Custom queries (specified manually). The search algorithm tries each of these search queries in order, by collecting all the results. When the desired number of results is obtained, the search is stopped.

When the products have missing UPC or Brand+MPN, or the products are being searched for substitute or compatible classifiers, Name becomes the key search string. Also, when the names are too specific, searching using generalized search strings becomes a key strategy, before giving up and asking a human to provide the search query. The generalization is done using the crystallized product and its category. Given a category, the tags (such as color, size etc.) are given priority codes. The lower the priority of the tag of a word, the first it gets dropped in the generalized query construction. High priority ones are retained by dropping all the low priority tagged words. For instance, need not match terms are dropped prior to must match terms.

Figure 3:
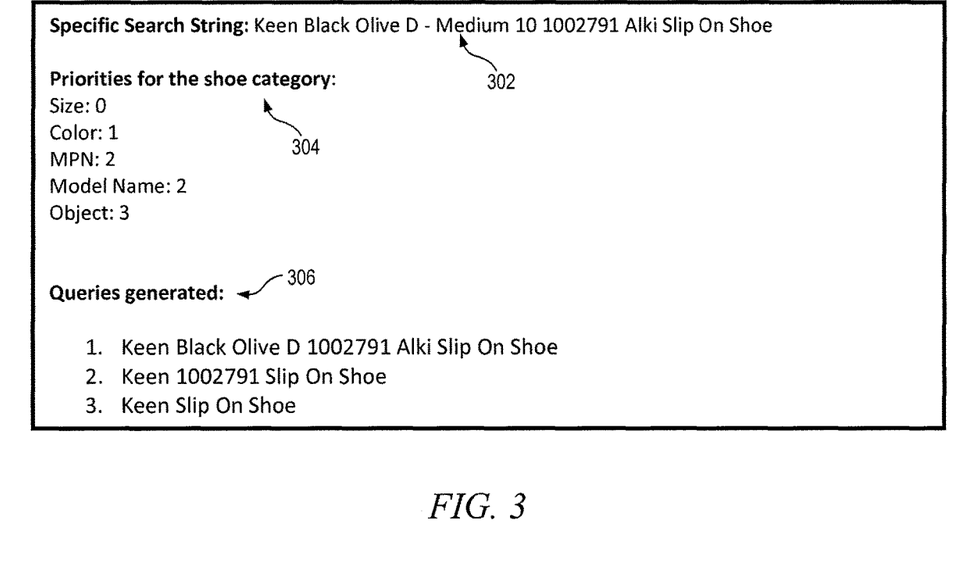
FIG. 3 depicts an example of query generation according to an embodiment.

Exemplary query generation is shown in FIG. 3. Shown is an initial specific search string 302. At 304, the tags are given priority code scores. At 306, exemplary successively general queries are shown. As can be seen, the lowest value scores are sequentially dropped off.

Returning to FIG. 2, as noted above, the terms are searched using the results from the crawler or using a search engine on the Internet. That is, the search may be implemented across the Internet 102 itself or based on the raw data store 116, e.g., a spidered local web cache.

The results of the search are competing pairs 210 (i.e., the customer product and the competing product(s)), stored in a database 118 (FIG. 1). Again, because the results obtained in the search may be of a nonstandard or unstructured format, the results are processed by crystallization at 204. The output of the crystallization is provided for Feature Extraction 212 and Filtering 214.

In some embodiments, Feature Extraction 212 converts the product pair into a vector of floating point numbers representing similarity across a variety of dimensions (e.g. UPC match, MPN match, brand match etc.). More particularly, Feature Extraction compares a particular aspect of two different products and computes a numeric similarity score between the products. For example, a UPC feature extractor compares the UPCs of the source and competing products to compute their UPC-similarity.

To compute these similarities, corresponding information for both source product and the competing product is necessary. If the corresponding field of the competing product is not readily available, the feature computation algorithm may look for the field value in the name and html of the competing product.

In particular, feature extractors that depend on reliable information such as UPC, MPN, Brand Name, etc., may follow this sequence: (1) Match against the extracted field; (2) Presence in the name; and (3) Presence in the html source of the page. For example: (1) UPC match against UPC; (2) Else, UPC presence in the name; and (3) Else, UPC presence in the HTML.

Figure 4:
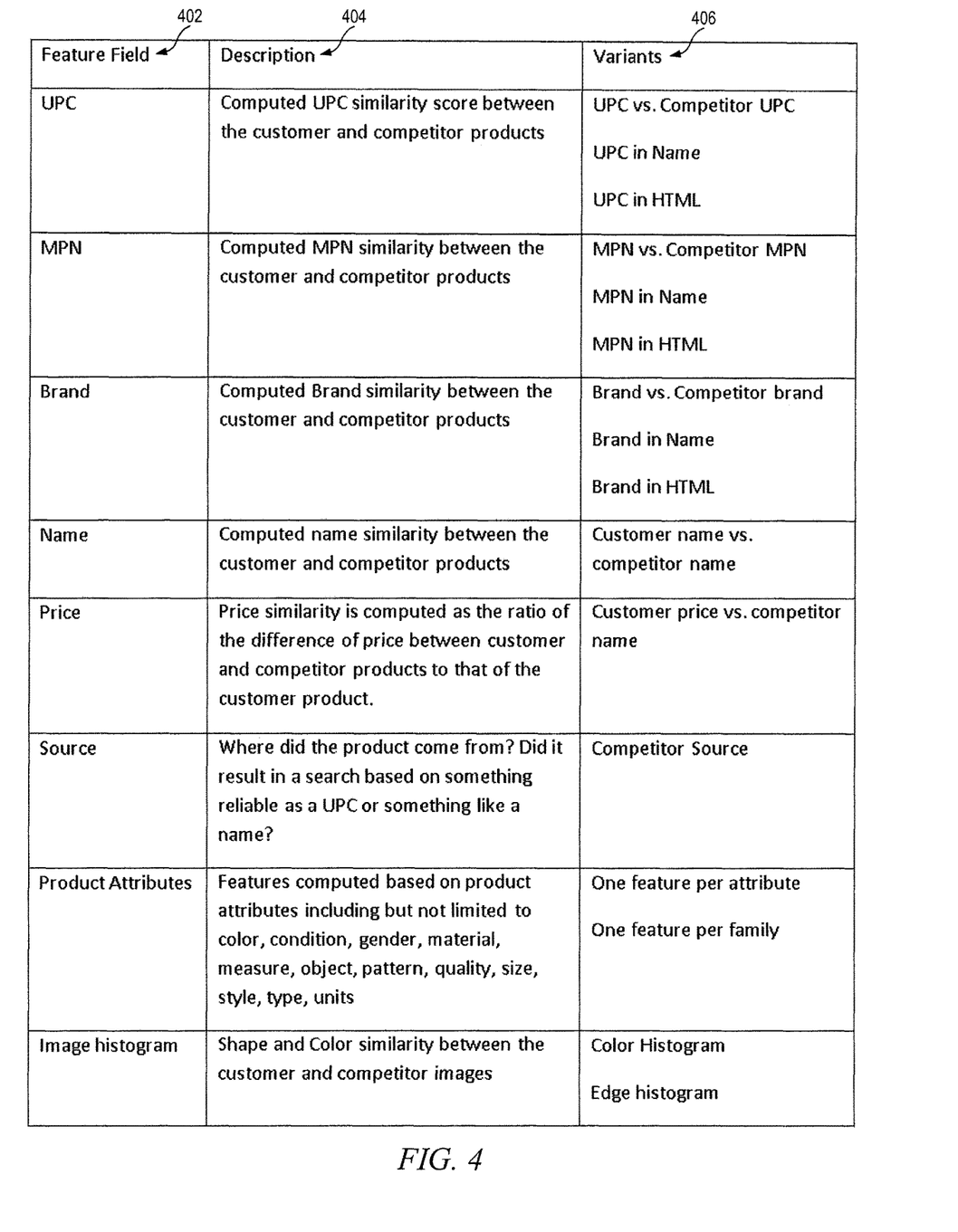
FIG. 4 illustrates exemplary extracted features according to an embodiment.

This is shown by way of example in tabular form in FIG. 4. In particular, the table illustrates a feature field 402, description 404, and variants 406. For example, an exemplary feature 402 is the UPC field. This can be embodied as a computed similarity score between the customer's product and the found competing products. In addition, particular implementations may base the score on where the UPC appears (anywhere on a page, in a name field, or in html). As shown in the table, other variants depending on the feature, are possible.

Returning to FIG. 2, filtering 214 performs hard matching based on the match constraints given by the customer. For example, the customer may specify that a color mismatch between a pair of products must be deemed a product mismatch. In some embodiments, if a pair violates a must match constraint, it is filtered out. The features extracted/filtered are then classified using a pre-trained logistic-regression classifier, at 216, as will be explained in greater detail below.

It is often the case that the fields required for feature computation are missing either in the source or in the competition. Further, there are two types of features: (1) Primary features; and (2) Secondary features. Primary features are computed based on highly reliable information such as UPC, MPN, Brand Name and Product Name, price and image. Secondary features are computed based on the attributes automatically identified from the name or HTML text of the page.

The missing feature case is when a field (e.g. UPC) from the source product is not found in the competing product. This does not mean the competing product is different, it just means there is not enough information to return a numeric value. Feature extractors of this type return NULL, separating a missing field value from a mismatching field value, where a corresponding but a different field value is found in the competing product.

Each feature can record two possible scenarios: (1) The presence or absence of the corresponding field in the source product or in the competing product (e.g., if the source product does not have a UPC, one cannot compute the UPC based features); or (2) The degree of the match, if the field is available in both source and competing products. The presence or absence of the feature is denoted by NULL, and the feature is called a null-able feature.

Classification 216 is a process in which a manually trained model 215a, derived from a process 215, is applied onto the feature vector. In general, various features are assigned different weights according to their importance in a match. Classification allows a single numeric value to be assigned to a given product, allowing for direct singular comparisons.

In some embodiments, using the classifier at 216, matching products are labeled as positive, and differing products are labeled −1. To do so, a logistic regression classifier 215b is learned from a set of manually labeled examples 215a that takes in a feature vector and outputs a classification confidence.

When a feature is null-able (i.e. can possibly take a null value), according to some embodiments, there are two classifiers built for that data, one with the feature and one without the feature (when it is null). If n features are null, then 2n classifiers are built. This is a large number when n is large. However, the value of n can be controlled by making the complete group null (e.g. MPN is null implies all its variants are null, which means for 3 variants only 2 classifiers are built as opposed to 8). Also, not every feature is null-able (e.g. name similarity—since names are always present, as opposed to UPCs or MPNs which may be missing sometimes).

It is noted that the number of attribute features could be potentially large and ever growing—and since the logistic regression classifier 215 requires a fixed number of features, this would create a problem. Thus, attributes may be binned into a fixed set of pre-defined families (or groups of features).

More particularly, a specific attribute is an attribute that is defined for a particular item. There could be many variants of the same specific attribute depending on the category of the item being considered. However, largely, all the variants can be grouped together into an attribute family. For computing the features, the attribute family may be used. New features based on different tags are easily added first by assigning them to the appropriate family and then selecting an appropriate feature computation mechanism.

Figure 5:
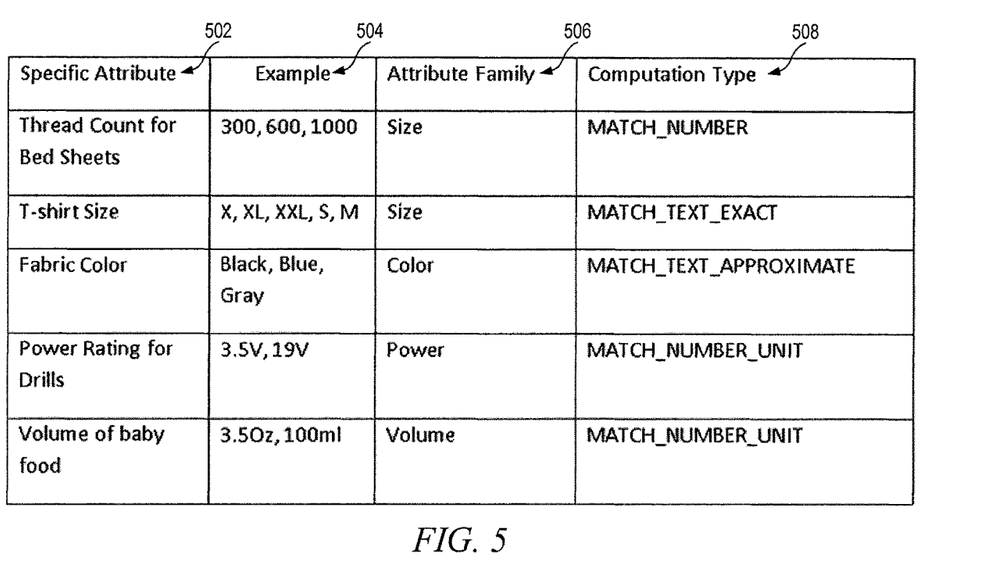
FIG. 5 illustrates exemplary attribute families according to an embodiment.

FIG. 5 illustrates exemplary use of attribute families to handle an arbitrary number, and type, of attributes. Shown are specific attributes 502, examples 504, associated attribute families 506, and corresponding match computation types 508.

Figure 6:
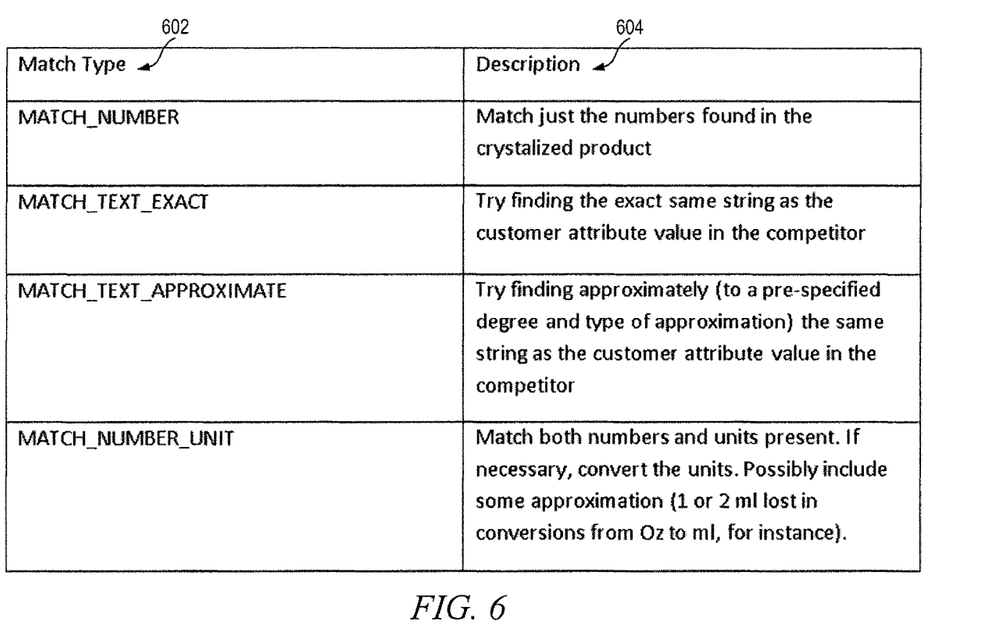
FIG. 6 illustrates exemplary match type routines according to an embodiment.

FIG. 6 illustrates exemplary computation types (from the example of FIG. 5). Shown are a match type 602 and corresponding description of the computation 604. The feature computation algorithm 212 (FIG. 2) selects the computation based on the feature family 506 (FIG. 5) selected. This selected "type" is then mapped to a function that computes a numeric similarity score between the input features. This similarity score can be computed based on similarity of numbers, strings, or both.

Figure 7:
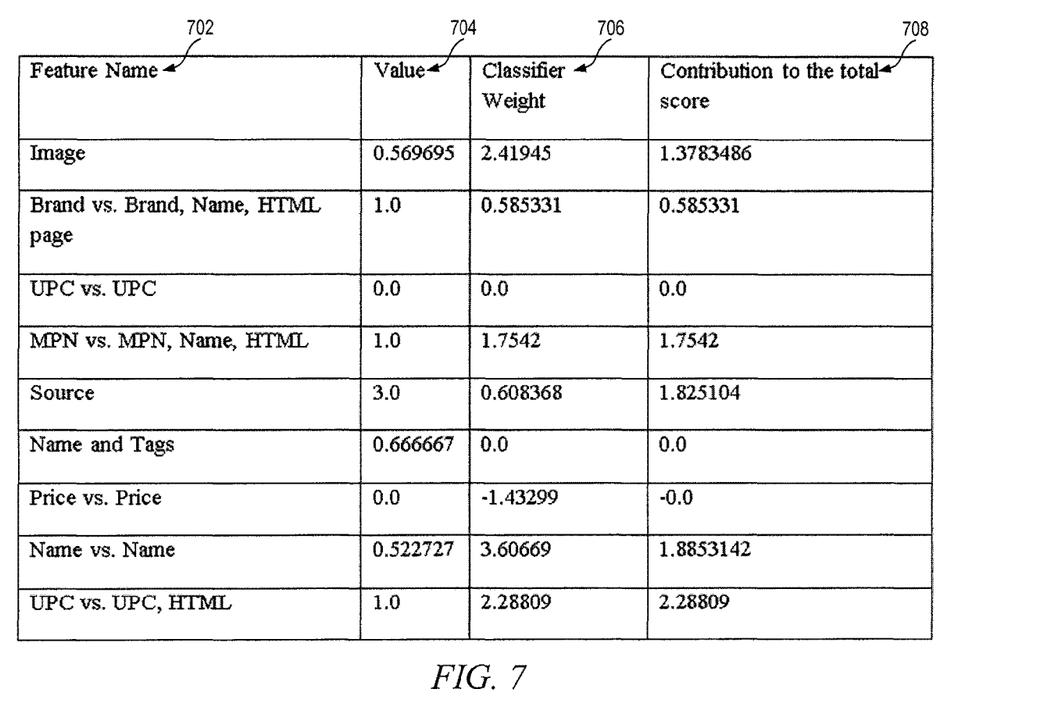
FIG. 7 illustrates exemplary features and classification weights.

An example feature vector computed is shown in FIG. 7. Shown are features 702, value 704, classifier weight 706, and contribution to the total score 708. That is, each feature returns a raw value 704 and has associated therewith a classifier weight 706, derived from the regression modeling 215. In the embodiment illustrated, the value 704 and the classifier weight 706 are multiplied together to obtain the contribution to the total score 708. These weights can be learnt using a Logistic Regression model learning algorithm. Other supervised learning algorithms can be also used.

Any supervised learning algorithm needs labeled training data. However, when the customer data is provided for the first time, labeled pairs of products and competing products are not available. For each source product feed (provided by the customer), two sets of classifiers are maintained—"generic" and "specific." Generic models are trained over all the labeled examples in the data store irrespective of the source company of the data. This can ensure that these classifiers perform well on average on all the stores. Both generic and specific classifiers address the missing features by training multiple classifiers as follows. One classifier can be trained by using only the examples for which the feature with missing values is not null, i.e., only the rows with that feature value present. The other classifier can be trained by removing the feature completely from all the training examples. This can be done for all the features. A technique used to reduce the combinatorial large number of classifiers generated can include deleting groups of related features that are bound to miss a value, instead of a single feature with the missing value.

Manual Training Data Labeling: Once few low-confidence pairs are identified, they can be sent for manual labeling after mixing them with a set of random data for avoiding over-fitting to a region in the feature space, and a set of gold standard data to evaluate the validity of the manual labels provided by the labeler. Once sufficient number of labeled pairs is obtained, specific models can be trained for the store.

Figure 8:
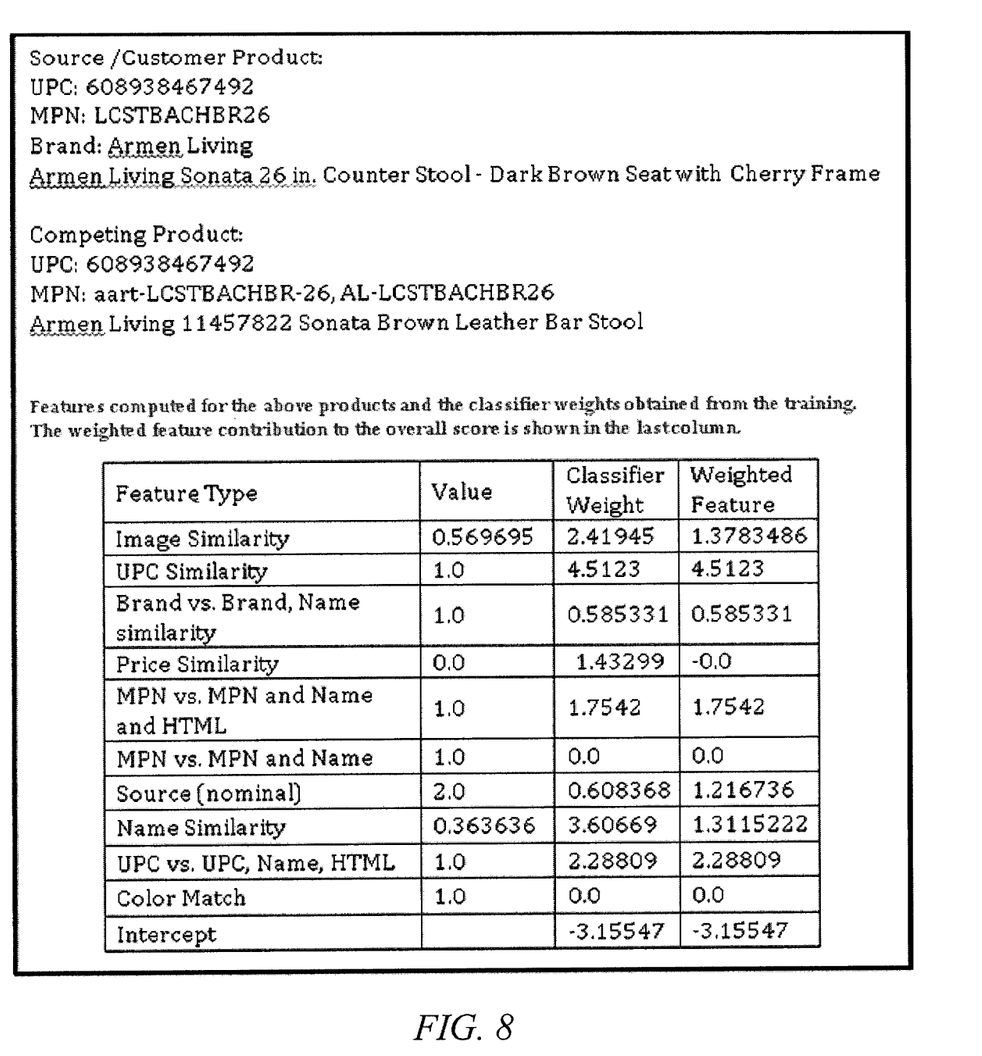
FIG. 8 illustrates exemplary computation of features and weighting by classification weights.

FIG. 8 depicts another example of classification of features computed for a source and a competing product. The table, similar to that of FIG. 7, illustrates classifier weights obtained from training with the weighted feature contribution to the overall score shown in the last column. In the example illustrated, Color Match is not used in the classification, but may be used in the filtering phase.

Returning to FIG. 2, post-processing 218 can involve cleaning the set of results identified as competing products after all the data pipeline is completed. For instance, in the case of exact match, it may ensure only one product is competing from one domain, by keeping only the highest confidence match from a domain (or a store). Finally, at 220, matching pairs of products and match confidence scores are provided to the customer.

Although the present disclosure has been described in terms of specific embodiments, these embodiments are merely illustrative, and not restrictive. The description herein of illustrated embodiments, including the description in the Abstract and Summary, is not intended to be exhaustive or to limit the disclosure to the precise forms disclosed herein (and in particular, the inclusion of any particular embodiment, feature or function within the Abstract or Summary is not intended to limit the scope of the disclosure to such embodiments, features or functions). Rather, the description is intended to describe illustrative embodiments, features and functions in order to provide a person of ordinary skill in the art context to understand the present disclosure without limiting same to any particularly described embodiment, feature or function, including any such embodiment feature or function described in the Abstract or Summary. While specific embodiments are described herein for illustrative purposes only, various equivalent modifications are possible, as those skilled in the relevant art will recognize and appreciate. As indicated, these modifications may be made in light of the foregoing description of illustrated embodiments and are to be included within the spirit and scope of the disclosure. Thus, various changes and substitutions are intended in the foregoing disclosures, and it will be appreciated that in some instances some features of embodiments will be employed without a corresponding use of other features without departing from the scope and spirit as set forth. Therefore, many modifications may be made to adapt a particular situation or material.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein.

In the description herein, numerous specific details are provided, such as examples of components and/or methods, to provide a thorough understanding of described embodiments. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. A person of ordinary skill in the art will recognize that additional embodiments are readily understandable from the disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the described embodiments.

It is also within the spirit and scope of the disclosure to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. Various embodiments may be implemented by using software programming or code in one or more general purpose digital computers, by using application specific integrated circuits, programmable logic devices, field programmable gate arrays, optical, chemical, biological, quantum or nanoengineered systems, or components and mechanisms may be used. In general, the functions of various embodiments can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The invention claimed is:

1. A method for automatically matching products, the method comprising:
   extracting at least one attribute of a source product from unstructured source product information received from a user, the extracting comprising identifying at least one tag in the unstructured source product information, wherein the at least one tag is associated with the at least one attribute of the source product and a priority of the at least one attribute within a product group to which the source product belongs;
   generating a search term from the at least one tag, wherein the search term comprises the at least one attribute;
   using the search term to search for competitor product information; and
   computing a similarity score between the source product information and the competitor product information, wherein computing the similarity score comprises:
      generating a first value pair for the source product and a first competitor product, and for the first value pair:
         assigning a value to a degree of similarity between the source product and the first competitor product with respect to a first common feature; and
         finding the product of the assigned value and a weight value assigned to the first common feature.

2. The method of claim 1, wherein computing the similarity score further comprises:
   for the first value pair:
      assigning a second value to a degree of similarity between the source product and the first competitor product with respect to a second common feature;
      finding the product of the assigned second value and a weight value assigned to the second common feature; and
      summing the product for the first common feature and the product for the second common feature.

3. The method of claim 1, wherein computing the similarity score further comprises:
   generating a second value pair for the source product and a second competitor product, and for the second value pair:

assigning a second value pair value to a degree of similarity between the source product and the second competitor product with respect to a feature common to the source product and second competitor product; and finding the product of the assigned second value pair value and a weight value assigned to the feature common to the source product and the second competitor product.

4. The method of claim 1, wherein the weight value assigned to the first common feature is computed according to a logistic regression model.

5. The method of claim 1, wherein generating the search term from the at least one tag comprises:
generating the search term according to the priority.

6. The method of claim 1, wherein generating a first value pair for the source product and a first competitor product comprises:
converting the first value pair into a vector, the vector representing similarity between the information relating to the source produce and the first competitor product.

7. The method of claim 1, further comprising:
filtering out at least one value pair that violates a must match constraint.

8. A system for automatically matching products, the system comprising:
a memory; and
a processor coupled to the memory, the processor configured to:
extract a plurality of attributes of a source product from source product information received from a user, the extracting comprising identifying a plurality of tags in the source product information, wherein each of the plurality of tags is associated with a respective one of the plurality of attributes of the source product and a respective priority of the respective one of the plurality of attributes within a product group to which the source product belongs;
use a first search query generated from the plurality of tags to search for competitor product information, wherein the first search query comprises a first subset of the plurality of attributes;
use a second search query generated from the plurality of tags to search for competitor product information, wherein the second search query comprises a second subset of the plurality of attributes that is different from the first subset, wherein the first search query comprises information that is more reliable than information in the second search query; and
compute a similarity score between the source product information and the competitor product information, wherein computing the similarity score comprises:
generate a first value pair for the source product and a first competitor product, and for the first value pair:
assign a value to a degree of similarity between the source product and the first competitor product with respect to a first common feature; and
find the product of the assigned value and a weight value assigned to the first common feature.

9. The system of claim 8, wherein the processor is further configured to:
for the first value pair:
assign a second value to a degree of similarity between the source product and the first competitor product with respect to a second common feature;
find the product of the assigned second value and a weight value assigned to the second common feature; and
sum the product for the first common feature and the product for the second common feature.

10. The system of claim 8, wherein the processor is further configured to:
generate a second value pair for the source product and a second competitor product, and for the second value pair:
assign a second value pair value to a degree of similarity between the source product and the second competitor product with respect to a feature common to the source product and second competitor product; and
find the product of the assigned second value pair value and a weight value assigned to the feature common to the source product and the second competitor product.

11. The system of claim 8, wherein the weight value assigned to the first common feature is computed according to a logistic regression model.

12. The system of claim 8, wherein the processor is further configured to:
generate the first search query according to the respective priorities associated with the plurality of tags.

13. The system of claim 8, wherein the processor is further configured to:
convert the first value pair into a vector, the vector representing similarity between the information relating to the source produce and the first competitor product.

14. The system of claim 8, wherein the processor is further configured to:
filter out at least one value pair that violates a must match constraint.

15. The method of claim 1, further comprising:
extracting at least a second attribute of the source product from the unstructured source product information received from the user, the extracting comprising identifying at least a second tag in the unstructured source product information, wherein the at least a second tag is associated with the at least a second attribute of the source product and a priority of the at least a second attribute within the product group to which the source product belongs;
wherein generating a search term comprises generating a search term from the at least one tag and the at least a second tag, wherein the search term comprises the at least a first attribute and the at least a second attribute.

16. The method of claim 15, wherein the search term is a first search term, wherein generating the search term further comprises:
generating a second search term comprising one of the at least one attribute or the at least a second attribute, but not the other of the at least one attribute or the at least a second attribute, based on the respective priorities associated with at least at least one tag and the at least a second tag.

17. The method of claim 1, wherein the priority associated with the at least one tag is defined according to a non-binary schema.

18. The system according to claim 8, the processor further configured to:
extract at least a second attribute of the source product from the unstructured source product information received from the user, the extracting comprising identifying at least a second tag in the unstructured source product information, wherein the at least a second tag is associated with the at least a second attribute of the source product and a priority of the at least a second attribute within the product group to which the source product belongs;

wherein generating a search term comprises generating a search term from the at least one tag and the at least a second tag.

19. The system of claim 18, wherein generating the search term comprises:

generating a first search term comprising the at least one attribute and the at least a second attribute; and generating a second search term comprising one of the at least one attribute or the at least a second attribute, but not the other of the at least one attribute or the at least a second attribute, based on the respective priorities associated with at least at least one tag and the at least a second tag.

20. The system of claim 8, wherein the priority associated with the at least one tag is defined according to a non-binary schema.

\* \* \* \* \*